June 23, 1970  J. J. BIRCH  3,516,931
PROCESS OF TREATING ACID MINE WATER
Filed Oct. 18, 1968  4 Sheets-Sheet 1

INVENTOR
Joseph J. Birch
BY
ATTORNEYS

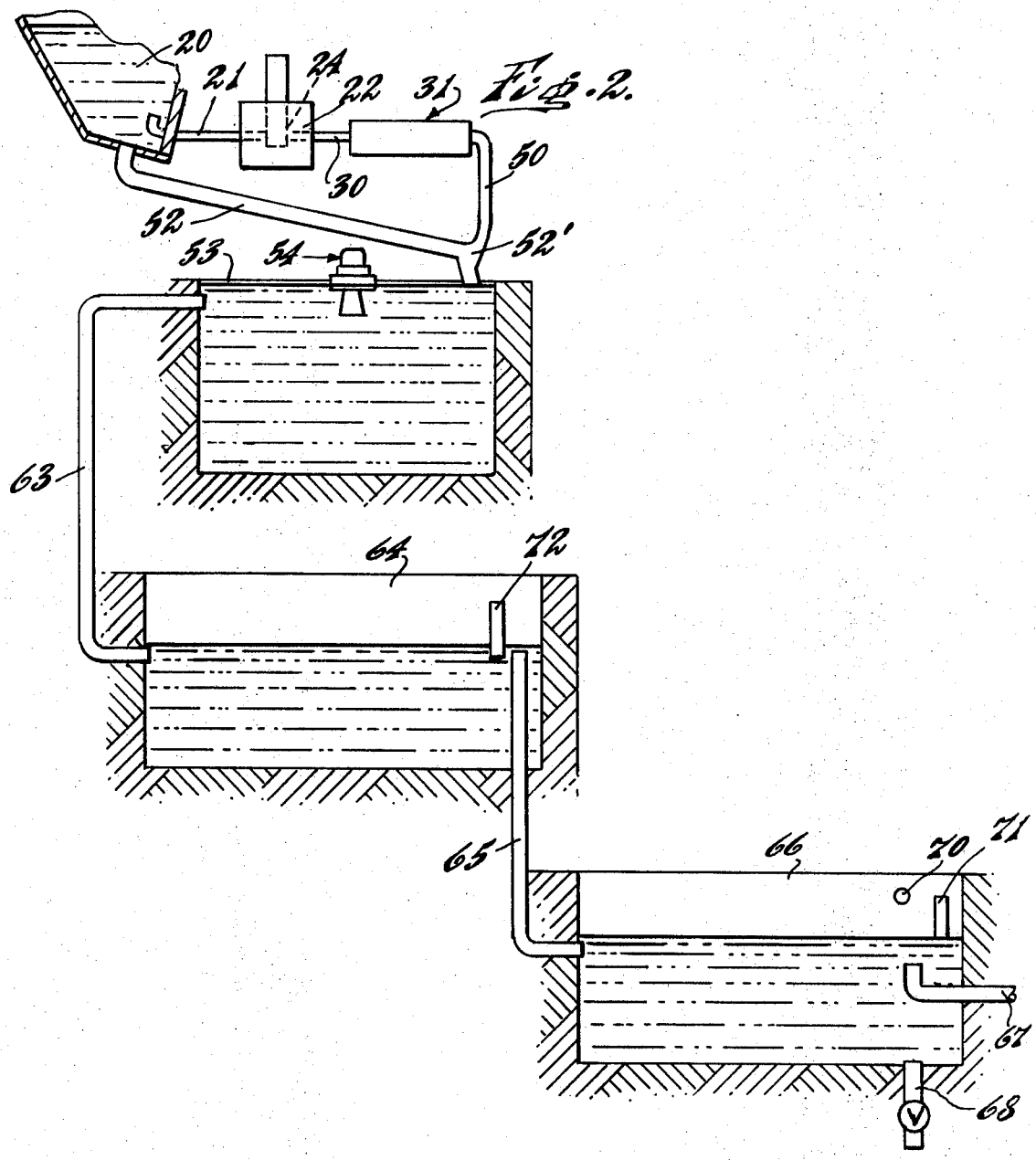

June 23, 1970   J. J. BIRCH   3,516,931
PROCESS OF TREATING ACID MINE WATER
Filed Oct. 18, 1968   4 Sheets-Sheet 3

INVENTOR
Joseph J. Birch
BY
ATTORNEYS

June 23, 1970 J. J. BIRCH 3,516,931
PROCESS OF TREATING ACID MINE WATER
Filed Oct. 18, 1968 4 Sheets-Sheet 4
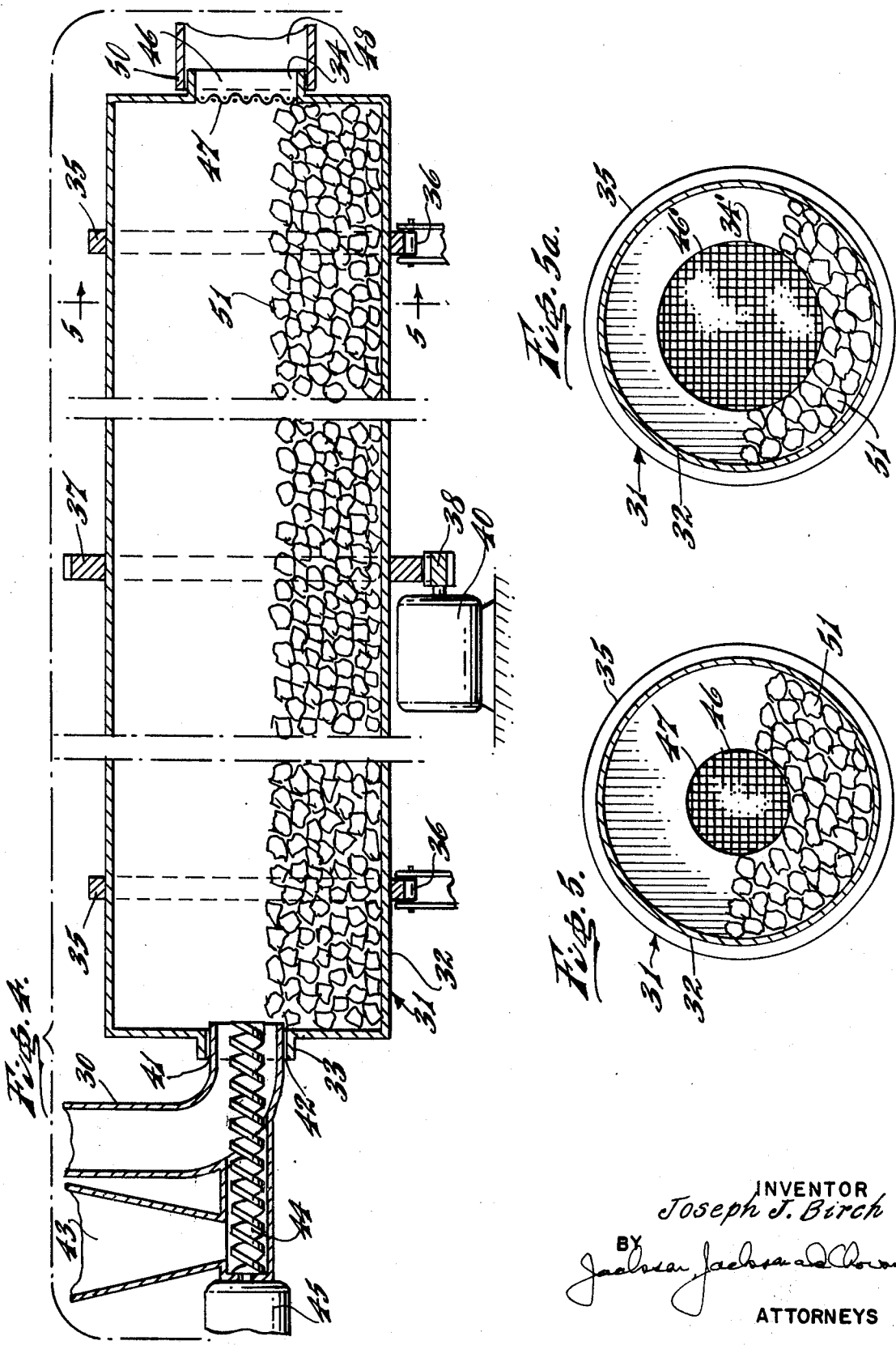
INVENTOR
Joseph J. Birch
BY
ATTORNEYS United States Patent Office 3,516,931
Patented June 23, 1970

3,516,931
PROCESS OF TREATING ACID MINE WATER
Joseph J. Birch, Johnstown, Pa., assignor to Barnes & Tucker Company, Haverford, Pa., a corporation of Pennsylvania
Filed Oct. 18, 1968, Ser. No. 768,714
Int. Cl. C02b 1/30, 5/04
U.S. Cl. 210—46          5 Claims

ABSTRACT OF THE DISCLOSURE

Water treatment for acid mine water which comprises first adding alkaline reactant such as lime in powdered form, carrying the mixture of water and powdered reactant through a rotating bed of limestone in the presence of air, thus adding calcium carbonate particles to the water, combining the water thus treated with raw acid mine water, aerating the mixture and allowing a flocculant precipitate or floc of ferric hydroxide and alumina to separate out.

---

The present invention relates to treating acid mine water and similar acid waters to eliminate the acidity, and remove objectionable quantities of iron, alumina, and other salts and minerals.

A purpose of the invention is to treat acid mine water at lower capital cost and lower operating cost.

A further purpose is to add a powdered alkaline reactant, suitably quick lime or hydrated lime, to a stream of acid mine water, to carry the water with the reactant into a rotating bed of limestone in the presence of air, to add the water now containing the reactant and particles of limestone to a further stream of said mine water, to aerate the combined water and to allow a flocculent precipitate or floc containing iron to separate out.

A further purpose is to slake caustic lime in the presence of the acid mine water before the stream enters the rotating bed of limestone.

A further purpose is to permit utilization of lowgrade limestone or dolomite in treating acid water.

A further purpose is to accomplish substantial aeration of the acid mine water in a mixing tank to which the lime is added.

A further purpose is to reduce the lime to a very finely divided form and aid it in going into solution in the acid mine water by the attrition accomplished in the rotating limestone bed of an attrition mill.

A further purpose is to abrade off minute particles of limestone in the attrition mill and add these to the water to give body to the flocculent precipitate or floc and avoid the necessity of employing another settling aid.

A further purpose is to neutralize part of the acidity of the acid mine water by the limestone in the attrition mill, evolving carbon dioxide and aiding in oxidizing ferrous iron by enhanced contact with air due to the carbon dioxide evolution.

A further purpose is to prevent limitation of the reaction with the limestone by plating or coating ferric hydroxide on the limestone, by the attrition occurring in the attrition mill which removes any coating from the limestone particles.

A further purpose is to aid in later precipitating a flocculent material by the action of the attrition mill in rendering the acid mine water alkaline. This also aids in oxidation of ferrous iron and prevents a green ferrous floc from later forming in the aeration pond. A green ferrous floc indicates incomplete conversion and removal of the soluble ferrous iron from the water.

A further purpose is to incorporate the effluent from the attrition mill with more acid mine water, thus using the flocculent precipitate or floc formed in the attrition mill to nucleate the formation of additional precipitate.

A further purpose is to aid in purifying the acid mine water bacteriologically by removing bacteria through adherence to the flocculent precipitate.

A further purpose is to recirculate water containing the flocculent precipitate of alumina and other salts and minerals at an earlier step in the system to further encourage nucleation of precipitate.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIG. 2 is a diagrammatic vertical section through the treatment plant shown in FIG. 1.

FIG. 4 is a vertical section through the attrition mill employed in the invention.

FIG. 5 is a transverse section through the attrition mill of FIG. 4 on the line 5—5.

FIG. 5a is a view similar to FIG. 5 showing a variation.

Figure 1:
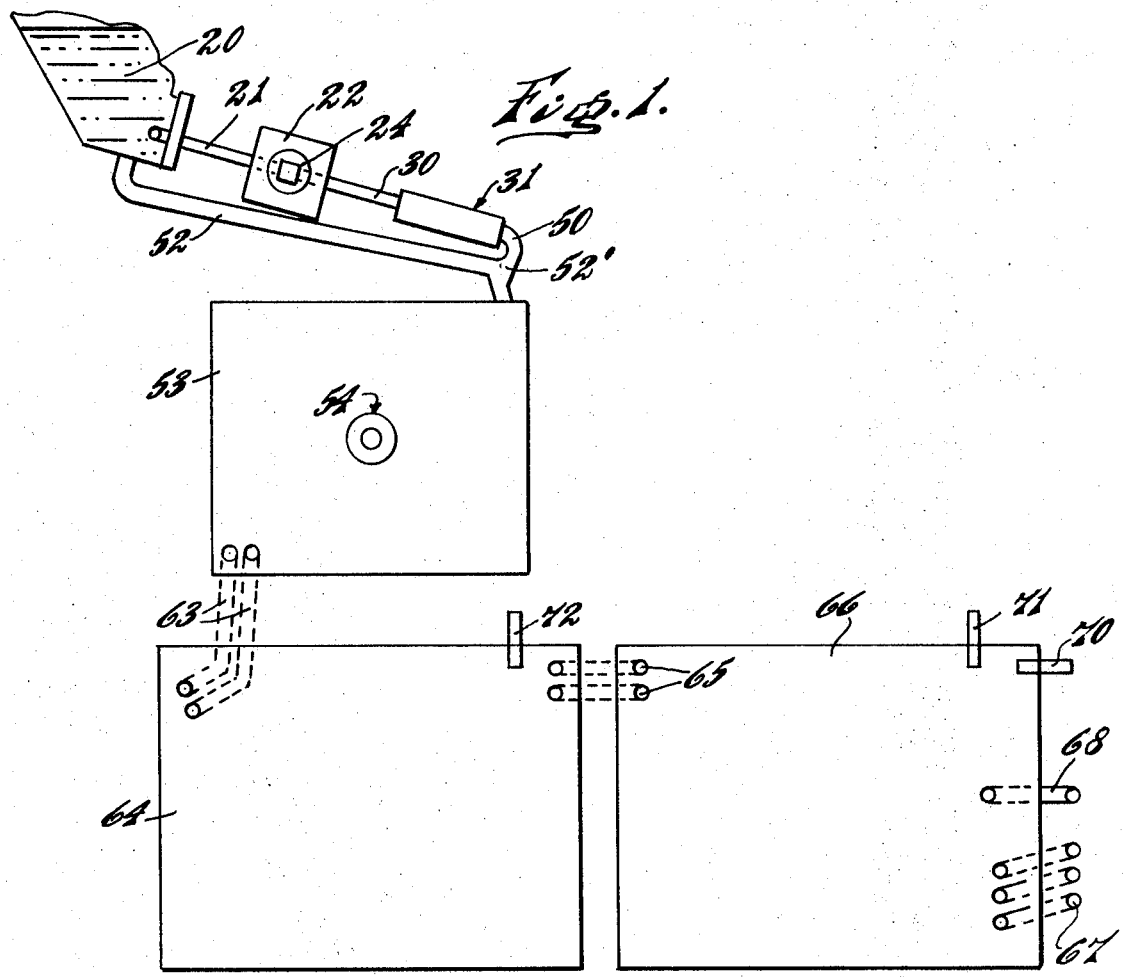
FIG. 1 is a diagrammatic plan view showing the treatment of acid mine water according to the invention.

Describing in illustration but not in limitation and referring to the drawings:

There is a serious problem in many mining areas in disposing of acid mine water which must be pumped from a mine in order to operate. Such mine water cannot be put in streams in civilized communities because of danger of killing fish, creating a hazard to human beings, and depositing objectionable quantities of floc or sludge in the streams. Such acid mine water is particularly common in coal mining areas.

There are also some acid industrial waters which are similar to acid mine water in their general composition and can be treated by the same procedure. For convenience the water for treatment is being referred to herein generally as acid mine water.

Acid mine water contains substantial amounts of acid, believed to be mostly sulfuric acid derived from deposits of iron pyrites underground, possibly by the action of bacteria. It contains considerable quantities of iron, 90 to 95% of which is in the form of ferrous iron.

The following are typical examples of raw acid mine waters encountered in Pennsylvania in the area of Barnesboro:

| | | | |
|---|---|---|---|
| pH | 3.1 | 2.7 | 3.1 |
| Total acidity, p.p.m | 766 | 600 | 529.9 |
| Total alkalinity, p.p.m | 0 | 0 | 0 |
| Total iron, p.p.m | 164.2 | 200 | 130 |
| Sulfate, p.p.m | 1,460 | | |

A very economical process for treating acid mine water is the Lewis process, depending on neutralization with lime. As previously applied, however, this process is quite expensive, both in capital equipment and in operation, involving the use of clarifiers and sometimes of filters.

The process of the present invention, representing a modification of the Lewis' process, offers the advantage of being very inexpensive in capital equipment, requiring no clarifiers or the like. Aside from a very minimum of treating equipment, the operation is carried on in a concrete tank and earthen ponds. Furthermore, the process of the invention permits very large through-puts, the plant being described serving to treat two million gallons of acid mine water per day.

As compared with other proposed installations, the cost of a plant of this size is only about $30,000 or about 10% of the cost of other plants. The treatment cost is only about 3 cents per thousand gallons as compared with 7 to 10 cents in other plants.

One of the great advantages of the process of the invention is that it can be carried out under gravity operation without the need for pumping water around the plant. Another great advantage is that the labor cost is a minimum. The plant will operate without attendants for considerable periods and when attendants are needed they are only concerned with such features as supplying chemicals, servicing equipment, and removing the floc formed.

Acid mine water enters from an intake 20 and is withdrawn through a pipe or channel 21 into a mixing tank 22, suitably a concrete septic tank. Quick lime or hydrated lime 23 from a storage hopper 24 is fed by a suitable power operated feeder 25 to introduce it at a controlled rate into the tank 22. In the tank 22 the lime forms a slurry 26 mixed by a suitable propeller mixer 27 driven, for example, by a motor 28. The lime slurry passes off at the top of the mixing tank 22 through a pipe or conduit 30.

At a suitable point below the mixing tank there is provided an attrition mill 31 having a cylindrical housing 32, an inlet end 33 and an outlet end 34. The attrition mill is conveniently made from a coal drying kiln or cement kiln removing the burners as no heat is applied in it. The attrition mill is conveniently arranged horizontally without any slope. The cylindrical housing 32 has journal bands 35 near the opposite ends which support it rotatably on pivotable rollers 36. At a convenient point near the center, a gear 37 is affixed around the outside of the housing and the mill is rotated by a pinion 38 driven by a drive 40.

The inlet end 33 has at the center an opening 41 into which enters an extension of pipe 30 bringing slurry from the mixing tank 22. The pipe 30 does not fit closely into the end 33 of the attrition mill but has a clearance 42 between the end of the mill and the outside of the pipe through which air enters. In operation the clearance 42 may be of the order of one-half to one inch at each side, on a mill of four feet diameter.

In order to permit charging additional limestone when required, a limestone hopper 43 feeds by a screw conveyor 44 driven by a drive 45 into the center of the pipe 30, leaving ample room around the limestone feed for entrance of slurry.

At the outlet end 34 the attrition mill has a plate or ring extending to a position near the center at which an opening 46 is provided covered with a fine screen 47 which will prevent the pieces of limestone from leaving the mill. A discharge pipe 48 discharges slurry that passes through screen 47 into a pipe or channel 50. Limestone lumps 51 in the interior of the attrition mill are desirably of a rather coarse size, of the order of 2 to 4 inches, and too large to leave through the screen 47 which may for example be of 20 Tyler standard mesh per linear inch.

In an alternate form of the attrition mill shown in FIG. 5a the ring-like plate at the outlet end at 34' has a ring thickness in the radial direction of about 10 inches, leaving a large screen opening 46'. This, therefore, retains a shallower content of water and suitably has a shallower content of limestone than the form of FIGS. 4 and 5.

The slurry of lime and water from the mixing tank passes through the attrition mill with air introduced in the attrition mill.

In an alternate form of operation, where for some reason the need for treating water drops off sharply for the moment, the feed of lime or other chemical to the mixing tank can be discontinued and for the time being reliance can be placed on the limestone for the treatment.

As another alternate in operation, the flow of water into the mixing tank can be cut down and, using quick lime, the temperature in the mixing tank can be allowed to rise until it is between 150° and 170° F., in which case the mixing tank will operate as a slaker and quickly hydrate the lime.

While high quality limestone can be employed in the attrition mill, it is by no means necessary, and limestone may be used which is of such low grade or so contaminated that it could not be used for other operations, and dolomite can also be employed instead of limestone.

Figure 6:
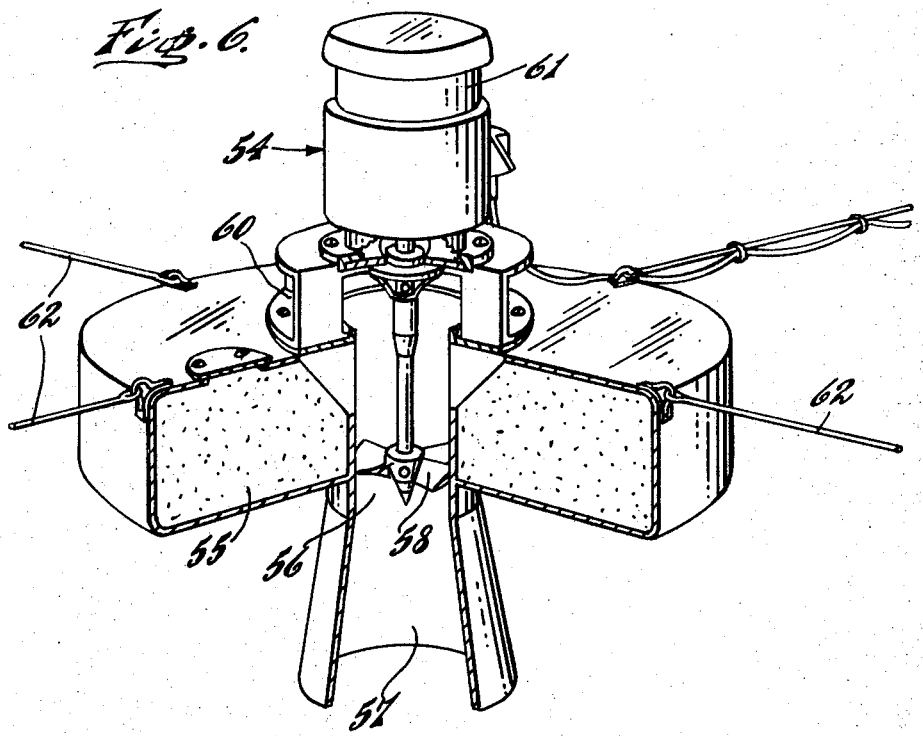
FIG. 6 is a fragmentary perspective of an aerator employed in the aeration pond of the invention.
Figure 3:
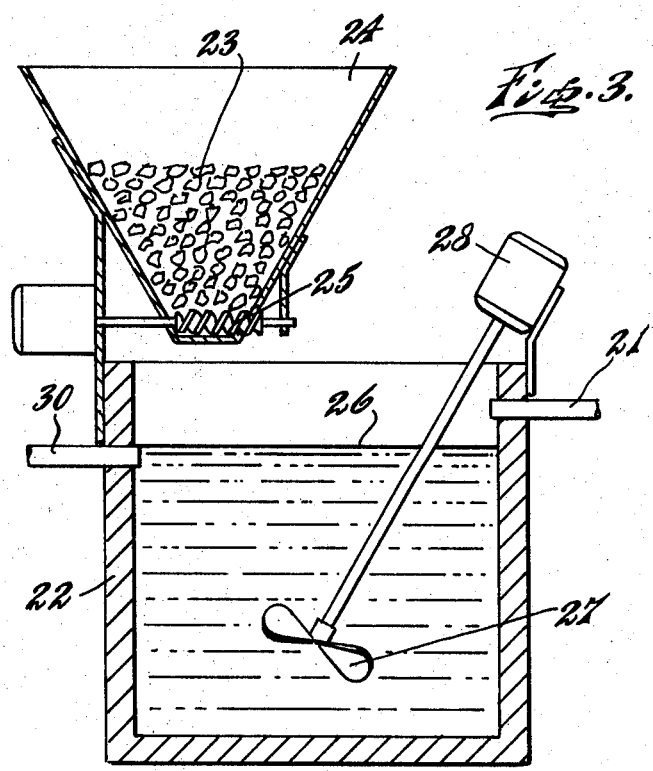
FIG. 3 is a diagrammatic illustration showing the mixing tank in which lime is incorporated with a first stream of acid mine water.

From the limestone attrition mill water leaving by the pipe 50 joins a main stream 52 of raw water from the intake 20 at a point 52' and then is discharged into an aeration pond 53 provided with an aerator 54. The aerator 54 as shown in FIG. 6 may conveniently be of the float type having a float 55 provided with a central opening 56 which circulates water through an intake 57 under the action of an impeller 58 and discharges it through ports 60 on top of the float. The impeller 58 is driven by a motor 61 supported on the float and the float is positioned by cables 62 extending to the edge of the aeration pond. The aeration pond in a plant handling two million gallons of acid mine water per day should preferably be of about 400,000 gallons capacity.

From the aeration pond, the water containing floc ready to precipitate is conducted through pipes 63 from a point near the top of the aeration pond to a settling pond 64 where the water is allowed to lie quiescent in order to settle out the floc. In a plant of the size of two million gallons treating capacity per day, the settling pond should desirably be of about 4,000,000 gallon capacity.

From the settling pond, water from a point near the top is carried over by pipes 65 to an equalization pond 66. In the case of a plant of about two million gallons per day capacity, the equalization pond should be about 4,000,000 gallons. The final treated effluent from the equalization pond passes by pipes 67, conveniently about half way up the height of the pond to a suitable stream. There are also provided a bottom pipe 68 provided with a normally closed valve for draining the equalization pond and a top overflow pipe 70.

The settling pond has near the outlet an automatic pH probe 72 and the equalization pond has at a point near the outlet an automatic pH probe 71. These probes and their automatic controllers can, if desired, be set to maintain a particular pH level and add to or reduce the feed of lime into the mixing tank as required to maintain such a level.

In operation, it should be kept in mind that one of the functions of the mixing tank, besides the addition of chemical, is to incorporate a substantial amount of air in the acid mine water to aid in oxidizing ferrous iron to ferric iron.

This is promoted by the introduction of air into the limestone attrition mill, where the air further promotes the oxidation of ferrous iron.

The limestone attrition mill promotes the reaction of quick lime or hydrated lime with the acid mine water because the particles of lime are broken up by the impact of the pieces of limestone, and much more rapidly dissolve in the water and react with the acid contained therein.

It will be evident, of course, that limestone is much less costly than lime, and there is therefore a distinct advantage in using limestone as a backup chemical to accomplish part, and in most instances, most of the neutralization.

Furthermore in the limesone attrition mill minute particles of limestone are added to the slurry and these partially function physically by adding body to the floc, making it settle much more rapidly in the settling pond. Due to the presence of these minute limestone particles, it is not necessary to add a settling aid such as activated silica, activated clay or diatomaceous earth, thus avoiding this expense.

A certain proportion of the limestone reacts with the acid in the water and a considerable amount of carbon dioxide is evolved in the attrition mill. This further aids in rapid oxidation of ferrous iron by causing a forth to form with the air.

One of the dangers to be avoided in a reaction of this type is that the floc or iron and alumina is likely to plate out or coat on the limestone and prevent further reaction. One of the important features of the present process is that the limestone attrition mill constantly breaks up any deposit or coating which forms on the limestone particles and keeps the limestone free to react with the water.

By the time the water has passed through the attrition mill, it contains a substantial quantity of flocculent iron hydroxide and alumina which has not yet settled but is ready to precipitate. This is encouraged, as well as the oxidation of the iron, by the increase in pH. Iron does not actually precipitate until a pH of 4.3 to 4.7 is achieved.

One of the great dangers of the process of the present character is that green ferrous floc might form in the aeration pond. This does not settle quickly in the settling pond. One of the great advantages of the present invention is that red brown ferric hydroxide floc is formed.

A typical analysis of the water as it leaves the attrition mill is as follows:

pH—12.5
Total acidity—0
Total alkalinity—1600 p.p.m.
Iron—0.5 p.p.m.

The attrition mill contributes greatly to the speed of treatment and therefore to the high through-put because it prevents the possibility that water could remain for a substantial time in contact with an alkaline reagent without reacting.

The acid mine water which goes through the attrition mill has a great excess of reacting chemical in it, and is designed to join the main water stream as it enters the aeration pond and there be subjected to substantial aeration which will aid in forming more flocculent precipitate and oxidizing the ferrous iron rather completely to ferric iron. It will be evident that the floc which passes from the attrition mill acts to nucleate other floc in the aeration pond. In order to further encourage nucleation, in one method of operation, I withdraw water containing floc from the aeration pond or the settling pond and feed it back into the raw water intake.

The aerator in the aeration pond produces a gentle agitation which prevents the floc from settling out, but at the same time must not be so violent that it will break up the floc into numerous fine particles, as this would prevent or delay later settling. After the floc leaves the aeration pond it should settle in 2 to 3 minutes after it enters the settling pond.

One of the contributions of the aeration pond is to introduce a great deal of air to aid in completing the oxidation of ferrous iron.

A typical analysis of the water as it leaves the aeration pond is as follows:

pH—11.5
Total acidity—0
Total alkalinity—150 p.p.m.
Total iron—2 p.p.m.

In the settling pond the floc or sludge settles out rapidly. A typical analysis in percent by weight on a dry basis of the coagulated floc is as follows:

| | Percent |
|---|---|
| Sulphur | 2.81 |
| Ferric oxide | 42.56 |
| Alumina | 46.04 |
| Volatile matter | 8.16 |

A typical analysis of the water as it leaves the settling pond is as follows:

pH—10
Total acidity—0
Total alkalinity—50 p.p.m.
Iron—0.5 p.p.m.

Eventually the settling pond will tend to fill with iron floc and this may begin to carry over into the equalization pond. At this point the iron floc should be pumped out and deposited, for example in an abandoned worked-out mine, an abandoned strip mine, or other depression. It can also be dried and utilized for its iron value.

In the equilization pond there is a tendency to reduce the total alkalinity slightly and remove any remaining floc. Typical analyses of the final treated water as it leaves the equalization pond and enters a stream are as follows:

| | | |
|---|---|---|
| pH | 9.85 | 7.2 |
| Total acidity | 0 | 0 |
| Total alkalinity, p.p.m. | 40 | 40 |
| Total iron, p.p.m. | 0.5 | 1.5 |

These waters are suitable for normal use. Humans can drink them, and swim in them, and they will not be harmful to fish.

A reaction by which iron is removed may be tentatively stated as follows:

$$FeSO_4 + 2H_2O \rightleftharpoons Fe(OH)_2 + H_2SO_4$$

$$2FeSO_4 + H_2SO_4 + \tfrac{1}{2}O_2 \rightleftharpoons Fe_2(SO_4)_3 + H_2O$$

$$Fe_2(SO_4)_3 + 6H_2O \rightleftharpoons 2Fe(OH)_3 + 3H_2SO_4$$

$$H_2SO_4 + Ca(OH)_2 \rightleftharpoons CaSO_4 + 2H_2O$$

$$FeSO_4 + Ca(OH)_2 \rightleftharpoons Fe(OH)_2 + CaSO_4$$

$$Fe_2(SO_4)_3 + 3Ca(OH)_2 \rightleftharpoons 2Fe(OH)_3 + 3CaSO_4$$

All analyses in percentage given herein are by weight.

When lime is referred to herein without any qualifying adjective, it is intended to designate calcium oxide or calcium hydroxide and not calcium carbonate. Calcium carbonate is referred to herein as limestone.

In view of my invention and disclosure, variations and modifications to meet individual whim or particular need will doubtless become evident to others skilled in the art to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. A process of treating acid mine water containing ferrous iron, which comprises first adding solid lime to the acid mine water, rotating a bed of limestone particles about a generally horizontal axis in an attrition mill to cause the limestone particles to rub against one another, next passing the water and the lime through the attrition mill and thus accelerating the solubility of the lime, introducing fine limestone particles to add body to a floc which will form, rendering the water alkaline, and preventing plating out of iron on the limestone particles, withdrawing treated water, lime and limestone particles from the rotating bed of limestone, aerating the water containing the floc, the lime and the limestone particles, and then separating floc from the water by sedimentation.

2. A process of claim 1, which comprises adding the water, lime and limestone particles with the floc to other acid mine water before sedimentation.

3. A process of claim 1, which comprises introducing air into the rotating limestone bed, promoting rapid conversion of ferrous iron to ferric iron and evolving carbon dioxide in the attrition mill to promote the reaction.

4. A process of claim 1, which comprises recirculating water containing floc into the acid mine water at an earlier stage in the process in order to promote nucleation of the floc.

5. A process for treating acid mine water containing ferrous iron, which comprises adding quick lime to the acid mine water, slaking the quick lime at elevated temperature in contact with the water, rotating a bed of limestone particles in an attrition mill, next passing the water and the lime through the attrition mill and thus accelerating the solubility of the lime, introducing fine limestone particles to add body to a floc which will form and preventing plating out of iron on the limestone particles, withdrawing treated water, lime and limestone particles from the rotating bed of limestone, and separating floc from the water by sedimentation.

References Cited

UNITED STATES PATENTS

| | | | |
|---|---|---|---|
| 1,254,009 | 1/1918 | Hughes et al. | 23—286 X |
| 3,218,252 | 11/1965 | Glover et al. | 210—7 X |
| 2,810,633 | 10/1957 | Cooper | 210—45 X |
| 1,310,382 | 7/1919 | Auld et al. | 210—45 |
| 1,248,329 | 11/1917 | Hughes | 210—45 X |
| 785,312 | 3/1905 | Langley | 210—50 |
| 773,395 | 10/1904 | Jones | 210—45 X |

OTHER REFERENCES

D. R. Maneval et al., A Mobile Demonstration Plant To Combat Acid Mine Drainage, Water and Sewage Works, vol. 112, July 1965, pp. 268–270.

MICHAEL E. ROGERS, Primary Examiner

U.S. Cl. X.R.

23—200; 210—50, 61, 199